United States Patent
Yan et al.

(10) Patent No.: US 7,251,622 B2
(45) Date of Patent: Jul. 31, 2007

(54) SYSTEM AND METHOD FOR SEARCHING FOR INFORMATION ON INVENTORY WITH VIRTUAL WAREHOUSES

(75) Inventors: Brina Yan, Shenzhen (CN); Alex Lee, Tu-Chen (TW); Hark Chen, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 906 days.

(21) Appl. No.: 10/157,510

(22) Filed: May 30, 2002

(65) Prior Publication Data

US 2003/0135433 A1    Jul. 17, 2003

(30) Foreign Application Priority Data

Jan. 16, 2002    (TW) .............................. 91100545 A (51) Int. Cl.
    *G06Q 17/60*    (2006.01)
(52) U.S. Cl. .......................................... 705/28; 705/22
(58) Field of Classification Search ................. 705/22, 705/28, 29
    See application file for complete search history.

(56) References Cited

U.S. PATENT DOCUMENTS

| | | | | |
|---|---|---|---|---|
| 5,572,653 | A | * | 11/1996 | DeTemple et al. ........... 345/501 |
| 5,671,362 | A | * | 9/1997 | Cowe et al. .................. 705/28 |
| 5,751,289 | A | * | 5/1998 | Myers ......................... 345/419 |
| 5,794,215 | A | * | 8/1998 | Goodwin, III ................ 705/26 |
| 5,999,879 | A | * | 12/1999 | Yano ........................... 701/208 |
| 6,160,553 | A | * | 12/2000 | Robertson et al. ........... 715/767 |
| 6,166,738 | A | | 12/2000 | Robertson et al. |
| 6,339,764 | B1 | * | 1/2002 | Livesay et al. ............... 705/28 |
| 6,349,244 | B1 | * | 2/2002 | Bardin et al. ............... 700/231 |
| 6,400,754 | B2 | * | 6/2002 | Fleming et al. ............. 375/140 |
| 6,598,025 | B1 | * | 7/2003 | Hamilton et al. ............. 705/22 |

(Continued)

FOREIGN PATENT DOCUMENTS

JP    02000215254 A    *    8/2000

OTHER PUBLICATIONS

White, Ron, How Computers Work, Millennium Ed., Que Corporation, Sep. 22, 1999.*

(Continued)

*Primary Examiner*—Elaine Gort
(74) *Attorney, Agent, or Firm*—Wei Te Chung (57) ABSTRACT

A system and method for searching for inventory information using a computerized virtual warehouse. The system includes a plurality of operation terminals (62) located in various warehouses (6) for inputting information on inventory received in and sent out from the warehouses, a database (21) for storing the information input by the operation terminals, and a virtual warehouse searching module (201) installed in a central management unit (200) for searching for the information on the inventory. The virtual warehouse searching module provides a computer-generated three-dimensional diagram of each warehouse which closely simulates an actual layout of the warehouse. A quantity searching module (202) is for searching for a quantity of inventory in each storage area of any warehouse using a computer-generated three-dimensional diagram. A total cost searching module (203) is for searching for a total cost of inventory in each storage area of any warehouse using a computer-generated three-dimensional diagram.

6 Claims, 6 Drawing Sheets

U.S. PATENT DOCUMENTS 6,748,295 B2 * 6/2004 Tilles et al. .................. 700/241
6,798,412 B2 * 9/2004 Cowperthwaite ............ 345/428
6,819,222 B2 * 11/2004 Lin et al. .................. 340/10.31
6,882,307 B1 * 4/2005 Gifford .................... 342/357.1
6,950,722 B2 * 9/2005 Mountz ...................... 700/214
6,959,862 B2 * 11/2005 Neumark .................... 235/385

OTHER PUBLICATIONS

Derfler, Frank J. et. al. How Networks Work, Millennium Ed., Que Corporation, Aug. 23, 2000.*

Gralla, Preston, How the Internet Works, Millennium Ed., Que Corporation, Sep. 23, 1999.*

Muller, Nathan J., Desktop Encyclopedia of the Internet, Artech House, Inc., 1998.*

Gralla, Preston, How the Internet Works, 6th Ed., Que Corporation, Sep. 7, 2001.*

Greene, James H., Editor-in-Chief, Production and Inventory Control Handbook, 3rd Ed., The McGraw-Hill Companies, Inc., 1997.*

Dobler, Donald W. and Burt, David N., Purchasing and Supply Management, Text & Cases, 6th Ed., The McGraw-Hill Companies, Inc., 1996.*

Chopra, Sunil, and Meindl, Peter; Supply Chain Mangement, Strategy, Planning, & Operation, Practice-Hall, Inc., Oct. 10, 2000.*

White, Ron, How Computers Work, 6th Ed., Que Corporation, Sep. 10, 2001.*

U.P.C. Symbol Specification Manual, Uniform Code Council, Inc., Mar. 4, 1996.*

White, James J., and Summers, Robert S., Uniform Commercial Code, 4th Ed., West Publishing Co., St. Paul, MN, 1995.*

Restatement of the Law, Second, Contracts 2d, §§1-385 & Their Comments, American Law Institute, St. Paul MN, 1981.*

* cited by examiner

Current Time:2001/11/12/PM4:30:20

| Owner | Item Code | Item Name | Quantity | Unit Price | Cost |
|---|---|---|---|---|---|
| M5 | 4D206-01C | SPS | 66 | 35.35 | 2333.10 USD |
| M2 | 4B023-05 | FDD | 905 | 7.75 | 7013.75 USD |
| M1 | 4J793-01 | SPS | 86 | 14 | 1204.00 USD |

Total Quantity:1306

Total Cost:13876.85 USD

Storing Area NO.1

SYSTEM AND METHOD FOR SEARCHING FOR INFORMATION ON INVENTORY WITH VIRTUAL WAREHOUSES

BACKGROUND OF THE INVENTION

1. Field of the Invention

The present invention relates to systems and methods for searching for information on inventory, and particularly to a system and method for searching for information on inventory using a computerized virtual warehouse which corresponds to an actual layout of a warehouse.

2. Description of Related Art

As web communications technology has advanced, information interchange within an enterprise or between enterprises is becoming easier than ever before. In the field of inventory management, more and more enterprises are beginning to handle inventory information via electronic communication networks. Generally, inventory information is stored in a database of a relevant department of an enterprise. Authorized users can visit the database via a network and retrieve data on the inventory from the database. The database is updated automatically or by hand at predetermined regular intervals.

However, the database storing the inventory information may contain a great deal of data on inventory used by various departments of the enterprise. The inventories of the departments may be stored in various storage areas in the warehouse, with the corresponding inventory information being recorded in the database and being indexed according to its storage area. A user who wants to search for required inventory may not know the exact storage area where the inventory is stored. Some software packages allow users to search for inventory information by keyword. Normally, data on inventory is input to the database automatically via a bar code reader or manually via a computer terminal. Oftentimes, a user who is not familiar with the format of inputting inventory data cannot determine a suitable keyword for searching the inventory information.

In addition, conventional inventory searching packages do not provide operators with any intuitive assistance for organizing inventory in the warehouse. Generally, operators in charge of the warehouse must manage the inventory according to the data stored in the database and the actual physical layout of the warehouse. However, it is unduly time-consuming to retrieve and compare data on the quantity and cost of inventory in each storage area before deciding how to organize and properly arrange the inventory in appropriate places in the warehouse.

Accordingly, what is needed is a system and method that provide users and operators with intuitive interfaces when searching for information on inventory in a warehouse and when managing such inventory.

SUMMARY OF THE INVENTION

A primary object of the present invention is to provide a system for searching for inventory information using a computerized virtual warehouse which corresponds to an actual layout of a warehouse.

Another object of the present invention is to provide a method for searching for inventory information using a computerized virtual warehouse which corresponds to an actual layout of a warehouse.

A further object of the present invention is to provide a system for searching for data on the quantity and cost of inventory with an intuitive interface.

In one aspect of the present invention, a system for searching for inventory information in a warehouse comprises a plurality of operation terminals located in various warehouses for inputting information on inventory received in and sent out from the warehouses; a database for storing the information input by the operation terminals; a central management unit for processing the information stored in the database; and a virtual warehouse searching module installed in the central management unit for searching for the information on the inventory. The virtual warehouse searching module provides a computer-generated three-dimensional diagram of each warehouse which closely simulates an actual layout of the warehouse. When a user clicks on an icon of the diagram, the user obtains corresponding information on inventory represented by the icon. A quantity searching module is provided for searching for a quantity of inventory in each storage area of any warehouse using a computer-generated three-dimensional diagram. A total cost searching module is provided for searching for a total cost of inventory in each storage area of any warehouse using a computer-generated three-dimensional diagram.

In another aspect of the present invention, a method for searching for inventory information in a warehouse comprises the steps of: providing at least one operation terminal located in at least one warehouse for inputting information on inventory received in and sent out from the at least one warehouse; providing a database for storing the information input by the at least one operation terminal; providing a computer-generated three-dimensional diagram of the at least one warehouse for searching for the information on the inventory, the three-dimensional diagram simulating an actual layout of the at least one warehouse; and linking icons in the three-dimensional diagram with corresponding information stored in the database.

Other objects, advantages and novel features of the present invention will be drawn from the following detailed description of preferred embodiments of the present invention with attached drawings, in which:

DETAILED DESCRIPTION OF THE INVENTION

Reference will now be made to the drawing figures to describe the present invention in detail.

Figure 1:
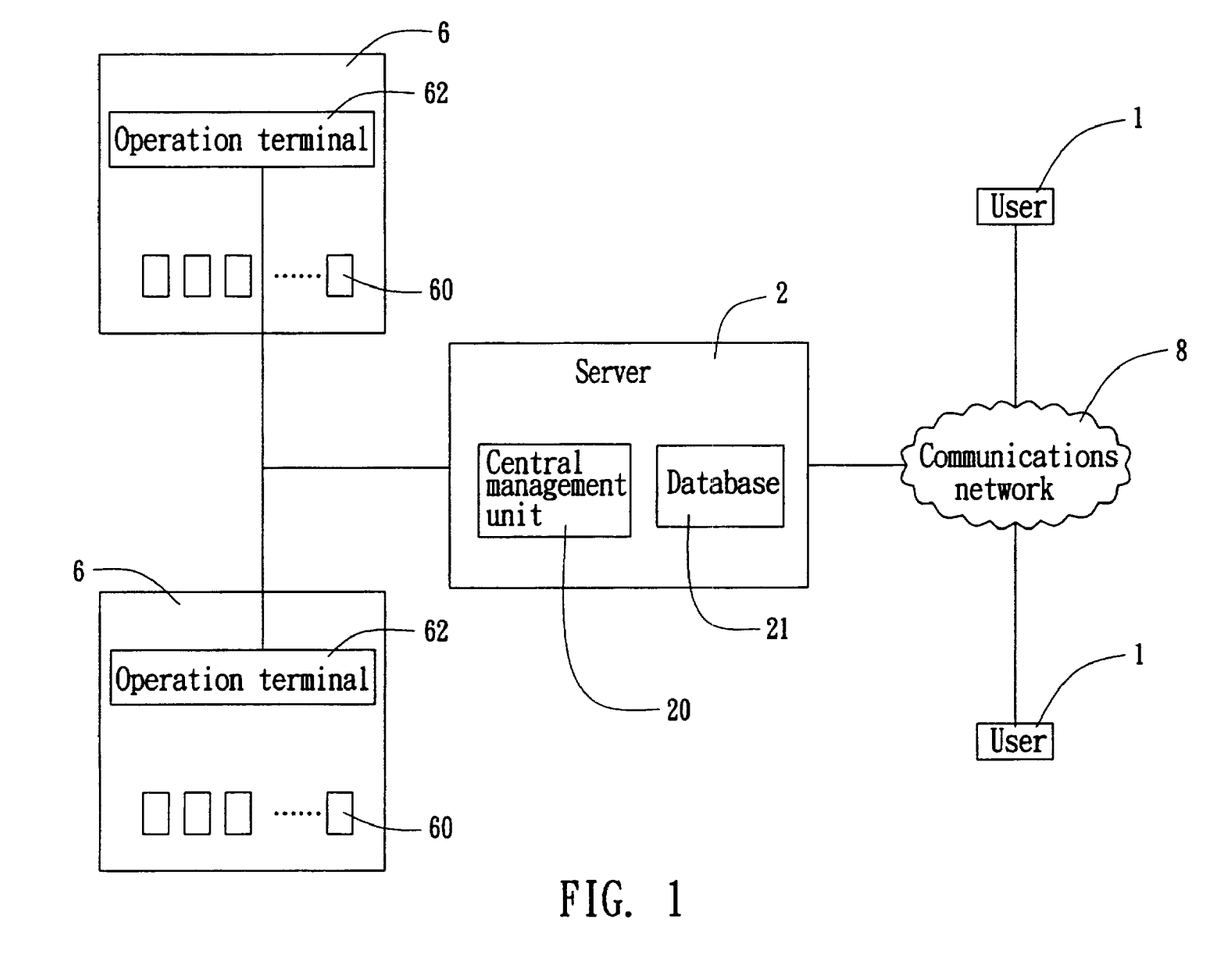
FIG. 1 is a schematic diagram of an inventory searching system according to a preferred embodiment of the present invention.

FIG. 1 is a schematic diagram of an inventory searching system according to a preferred embodiment of the present invention. The system comprises a plurality of operation terminals 62 located in various warehouses 6 for inputting information on inventory received in and sent out from the warehouses 6, and a server 2 for receiving and processing the information recorded by the operation terminals 62. If authorized, users 1 can visit the server 2 via a communications network 8. Generally, each warehouse 6 has a plurality of storage areas 60 for storing the inventory.

The server 2 comprises a central management unit 20 for processing information on inventory in the warehouses 6, and a database 21 for storing information. When inventory is received in or sent out from a warehouse 6, the operation terminals 62 input information on the inventory to the database 21 by bar code readers or by hand. The information on the inventory comprises item name, specification, quantity, department, unit price, and the storage area 60 where the inventory is stored. The inventory information stored in the database 21 is updated when the operation terminals 62 input new information on inventory. Consequently, whenever the users 1 visit the database 21, they can obtain fully up-to-date information on the inventory in the warehouses 6.

Figure 2:
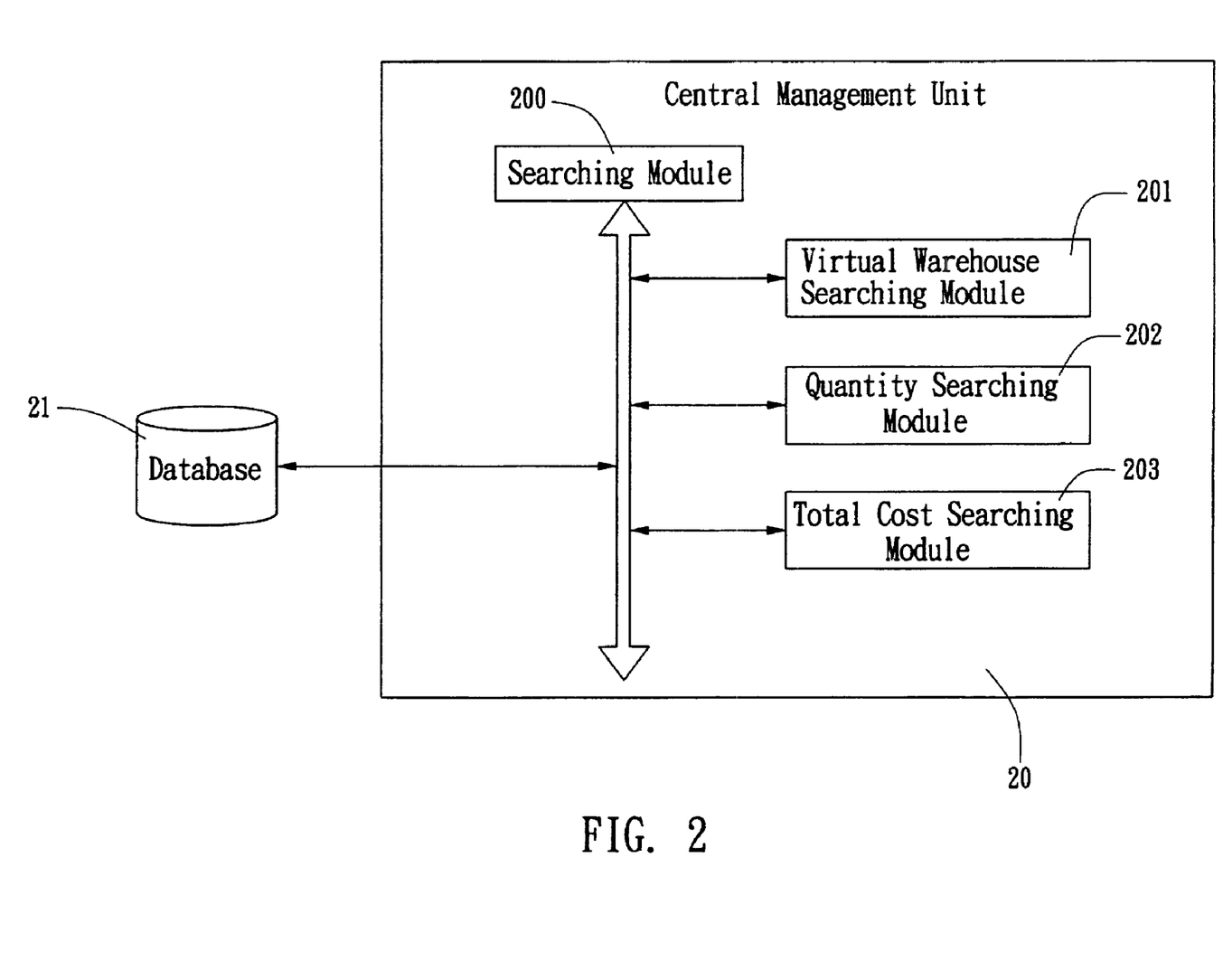
FIG. 2 is a schematic diagram showing information processing in the inventory searching system of FIG. 1.

FIG. 2 is a schematic diagram showing information processing in the inventory searching system. The central management unit 20 comprises a searching module 200 for searching for inventory information stored in the database 21. The searching module 200 comprises three sub-modules: a virtual warehouse searching module 201, a quantity searching module 202, and a total cost searching module 203. The virtual warehouse searching module 201 provides the users 1 with computer-generated three-dimensional diagrams of the warehouses 6 which closely simulate actual layouts of the warehouses 6. The users 1 can ascertain an inventory status of each storage area 60 in any warehouse 6 by clicking on a corresponding position on the three-dimensional diagram. The function of virtual warehouse searching is described in detail below with reference to FIG. 3. The quantity searching module 202 provides a three-dimensional diagram showing a quantity of inventory in each storage area 60 of any warehouse 6. By clicking on a corresponding position on the three-dimensional diagram, a user 1 can ascertain a detailed inventory status of the storage area 60. A detailed description of ascertaining inventory status is given below with reference to FIG. 5. The total cost searching module 203 provides a three-dimensional diagram showing the total cost of each storage area 60 in any warehouse 6. By clicking on a corresponding position on the three-dimensional diagram, the user 1 can ascertain a detailed total cost status of the storage area 60. A detailed description of ascertaining total cost status is given below with reference to FIG. 6.

In the preferred embodiment of the present invention, the inventory searching system provides each user 1 with a computer searching interface that includes the functions of the three searching modules 201, 202, 203. Authorized users 1 can search for their required information on inventory with the help of the three searching modules 201, 202, 203.

Figure 3:
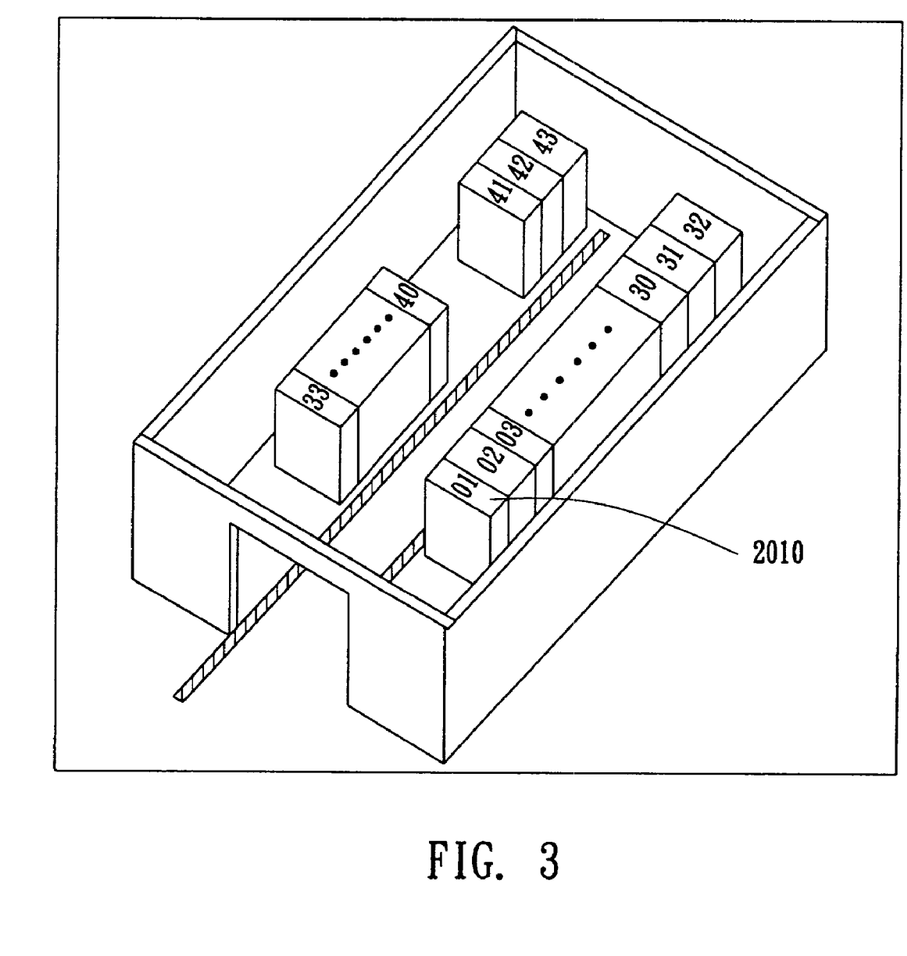
FIG. 3 is an exemplary computer-generated three-dimensional diagram of a warehouse of the inventory searching system of FIG. 1.

FIG. 3 is an exemplary computer-generated three-dimensional diagram of a warehouse 6. When an authorized user 1 operates the virtual warehouse searching module 201, the inventory searching system retrieves a three-dimensional diagram of the warehouse 6 which closely simulates an actual layout of the warehouse 6. The diagram comprises a plurality of storage area icons 2010 representing actual storage areas 60 of the warehouse 6. When the user 1 clicks on any storage area icon 2010, the user 1 can retrieve the corresponding inventory information on his or her operation terminal 62.

Figure 4:
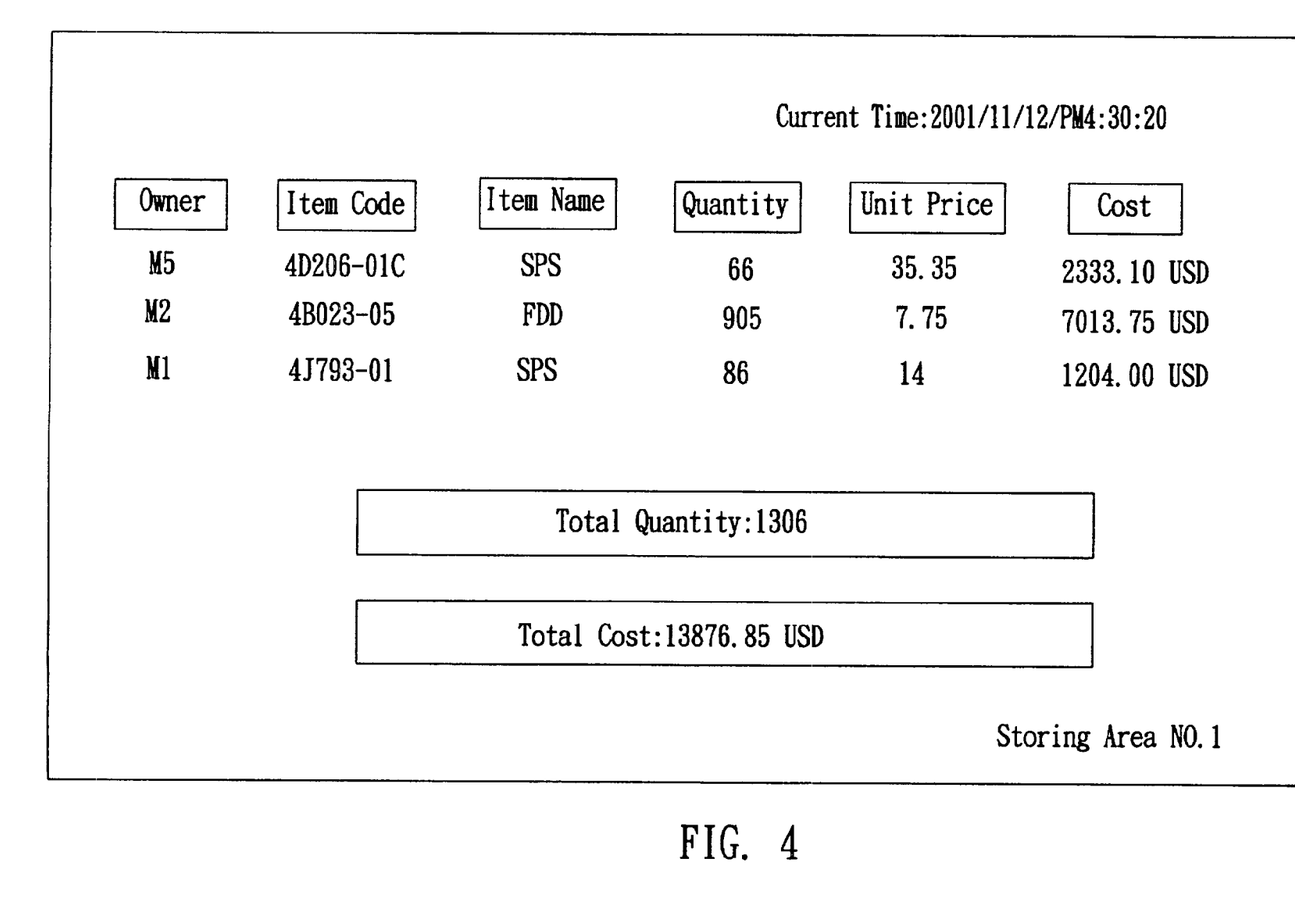
FIG. 4 is an exemplary computer display showing detailed inventory information on a storage area of a warehouse of the inventory searching system of FIG. 1.

FIG. 4 is an exemplary computer display showing detailed inventory information on a storage area 60 of a warehouse 6. The detailed inventory information comprises owner of the item, internal item code, item name, quantity, unit price, cost, total quantity and total cost of the inventory stored in the storage area 60.

Figure 5:
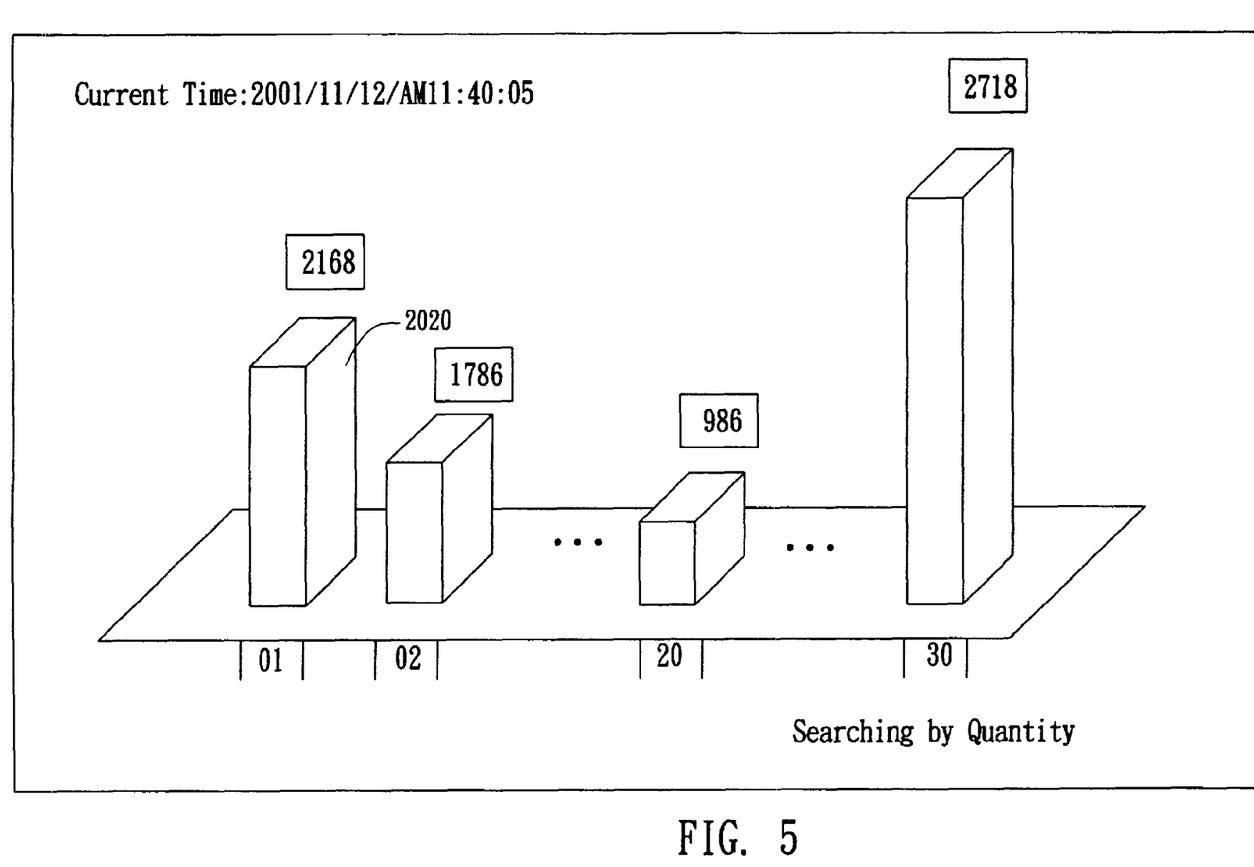
FIG. 5 is an exemplary computer-generated three-dimensional diagram showing a quantity of inventory stored in each storage area of a warehouse of the inventory searching system of FIG. 1.

FIG. 5 is an exemplary computer-generated three-dimensional diagram showing a quantity of inventory stored in each storage area 60 of a warehouse 6. When an authorized user 1 operates the quantity searching module 202, the inventory searching system retrieves a three-dimensional diagram of quantity of the storage area 60. Each column 2020 shown on the diagram represents one storage area 60. A height of the column 2020 corresponds to a current quantity of the storage area 60. The current quantity number is shown above the column 2020. By clicking on the column 2020, the user 1 can retrieve the computerized view of FIG. 4 that shows detailed inventory information on the storage area 60. The quantity searching module 202 provides an intuitive diagram for users 1 who can then immediately ascertain an inventory status of each storage area 60 and decide how to organize and arrange storage space in the warehouse 6.

Figure 6:
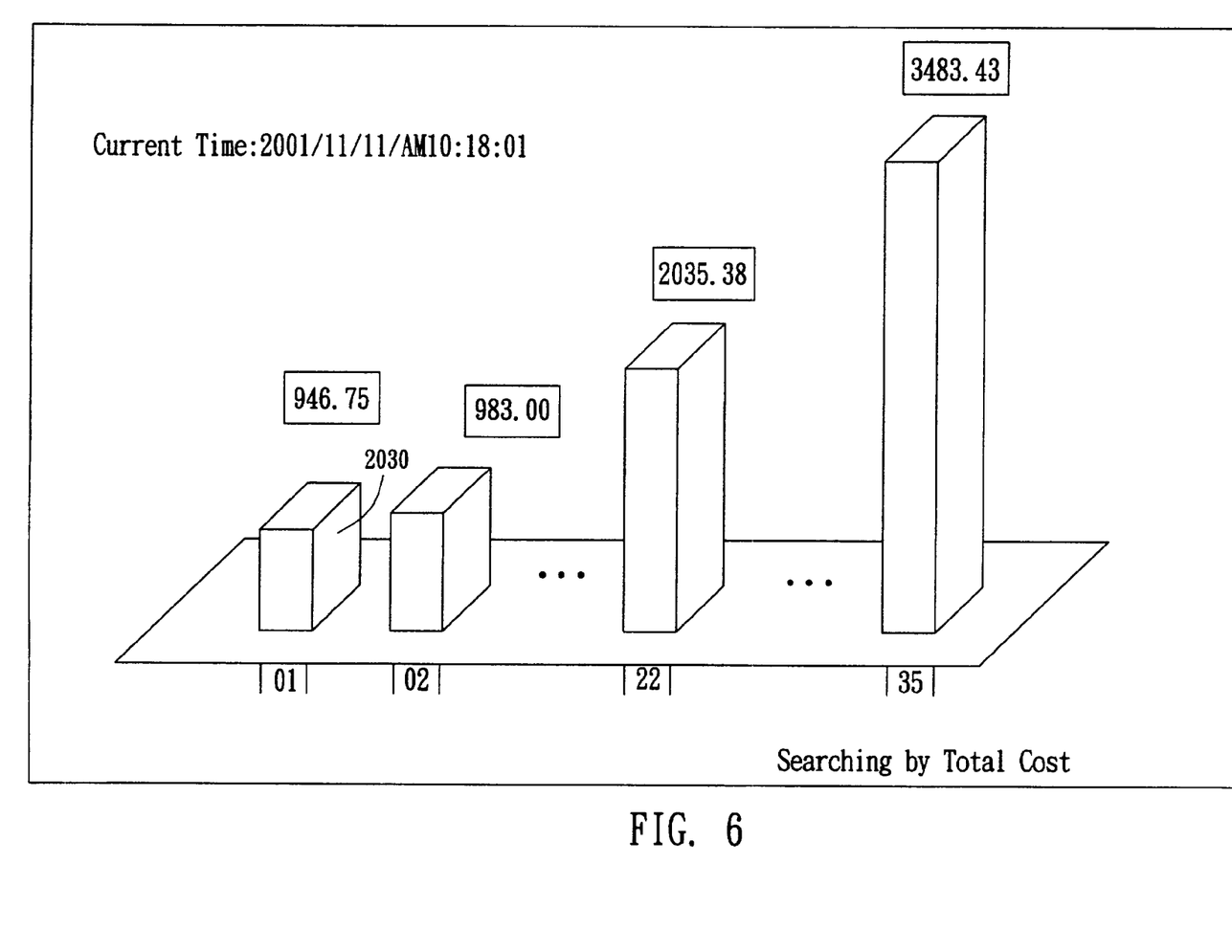
FIG. 6 is an exemplary computer-generated three-dimensional diagram showing a total cost of inventory stored in each storage area of a warehouse of the inventory searching system of FIG. 1.

FIG. 6 is an exemplary computer-generated three-dimensional diagram showing a total cost of inventory stored in each storage area 60 of a warehouse 6. When an authorized user 1 operates the total cost searching module 203, the inventory searching system retrieves a three-dimensional diagram of a total cost of the storage area 60. Each column 2030 shown on the diagram represents one storage area 60. A height of the column 2030 corresponds to a current total cost of the storage area 60. The current total cost number is shown above the column 2030. By clicking on the column 2030, the user 1 can retrieve the computerized view of FIG. 4 that shows detailed inventory information on the storage area 60. The total cost searching module 203 makes it easy for users 1 to locate important inventory in the warehouse 6 and decide how to manage the inventory.

The preferred embodiment described herein is merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims which follow and their equivalents.

What is claimed is:

1. A system for searching for information on inventory stored in at least one warehouse, the system comprising:

at least one operation terminal located in the at least one warehouse for inputting information on inventory;

a plurality of storage areas in the at least one warehouse which stores inventory;

a database which stores and updates the information input by die at least one operation terminal, the information comprising item name, a specification, quantity, department, unit price, and a storage area where the inventory is stored; and     a central management unit comprising:

a virtual warehouse searching module for searching for the information on the inventory stored in the database, the virtual warehouse searching module providing a computer-generated three-dimensional diagram of the at least one warehouse which simulates actual layout of the at least one warehouse, the diagram comprising a plurality of storage area icons representing storage areas of the at least one warehouse, wherein by clicking on an icon a user obtains corresponding information on inventory located in the area represented by the icon, and wherein the central management unit further comprises a total cost searching module providing a computer-generated three-dimensional diagram of total cost of the inventory in various storage areas of the at least one warehouse.

2. The system as claimed in claim 1, wherein the central management unit further comprises a quantity searching module providing a computer generated three-dimensional diagram of quantity of the inventory in the at least one warehouse.

3. The system as claimed in claim 2, wherein the three-dimensional diagram of quantity comprises a plurality of columns showing quantity of inventory in various storage areas of the at least one warehouse, a height of each of the columns corresponding to a quantity of the inventory in a corresponding storage area.

4. The system as claimed in claim 1, wherein the three-dimensional diagram of total cost comprises a plurality of columns showing total cost of inventory in various storage areas of the at least one warehouse, a height of each of the columns corresponding to a total cost of the inventory in a corresponding storage area.

5. The system as claimed in claim 1, further comprising a communications network through which a user can retrieve the information stored in the database.

6. The system as claimed in claim 5, wherein the communications network comprises a network selected from the group consisting of intranets and the Internet.

* * * * *